United States Patent [19]
Fukawatase et al.

[11] Patent Number: 5,752,716
[45] Date of Patent: May 19, 1998

[54] INFLATOR WITH AN ACTUATION INDICATOR

[75] Inventors: Osamu Fukawatase, Nishikamo-gun; Makoto Hamada, Toyota; Ryuichi Yamada, Anjo, all of Japan

[73] Assignee: Toyota Jidosha Kabushiki Kaisha, Toyota, Japan

[21] Appl. No.: 651,426

[22] Filed: May 22, 1996

[30] Foreign Application Priority Data

May 30, 1995 [JP] Japan ................. 7-132089

[51] Int. Cl.$^6$ ................. B60R 21/26
[52] U.S. Cl. ................. 280/741; 374/106
[58] Field of Search ................. 280/741, 736; 374/106, 162, 104; 116/216

[56] References Cited

U.S. PATENT DOCUMENTS

| | | | |
|---|---|---|---|
| 3,513,705 | 5/1970 | Severin | 374/106 |
| 5,120,137 | 6/1992 | Ou-Yang | 374/106 |
| 5,215,378 | 6/1993 | Manske | 374/106 |
| 5,346,251 | 9/1994 | Burnard et al. | 280/741 X |
| 5,542,693 | 8/1996 | Koide | 280/741 X |

FOREIGN PATENT DOCUMENTS

| | | |
|---|---|---|
| A-2074975 | 11/1981 | European Pat. Off. . |
| A-447633 | 9/1991 | European Pat. Off. . |
| A-2243140 | 10/1991 | European Pat. Off. . |
| A-625700 | 11/1994 | European Pat. Off. . |
| 0 747 270A2 | 12/1996 | European Pat. Off. . |
| 5-213149A | 8/1993 | Japan . |

OTHER PUBLICATIONS

Folder on "Morton Automotive Safety Products" Nov. 1995.
Patent Abstracts of Japan, vol. 12, No. 429 (P-785), Nov. 14, 1988 JP-A-63 163233 (Matsumoto Kosan K.K.), Jul. 6, 1988.
Patent Abstracts of Japan, vol. 5, No. 124 (C-066), Aug. 11, 1991 JP-A-56 061468 (Matsumoto Yushi Seiyaku K.K.), May 26, 1981.

*Primary Examiner*—Christopher P. Ellis
*Attorney, Agent, or Firm*—Kenyon & Kenyon

[57] ABSTRACT

An inflator which generates gas and heat as the inflator is actuated. The inflator includes an identifying member. The identifying member is provided on the inflator so as to permit the identification of an unactuated state and an actuated state of the inflator on the basis of heat generated during the actuation of the inflator.

20 Claims, 7 Drawing Sheets

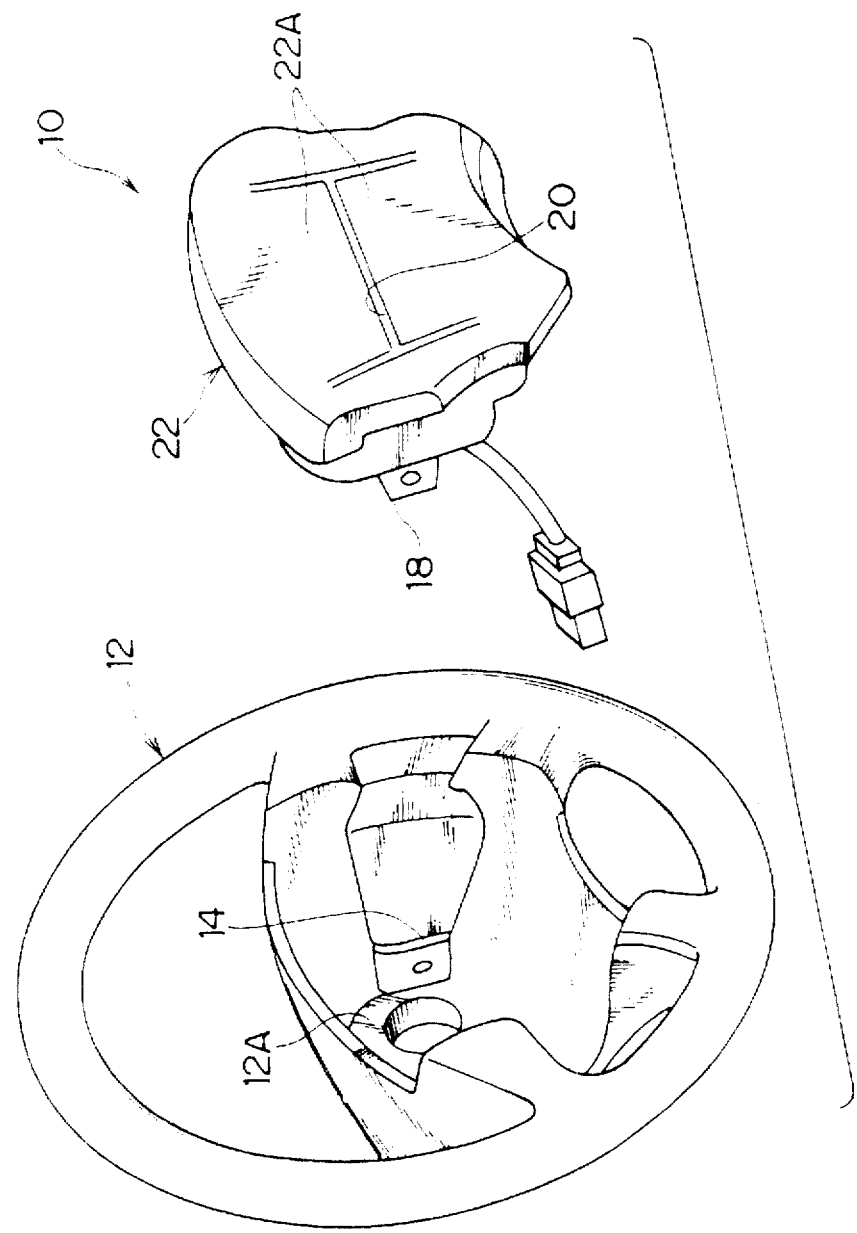

F I G. 4A
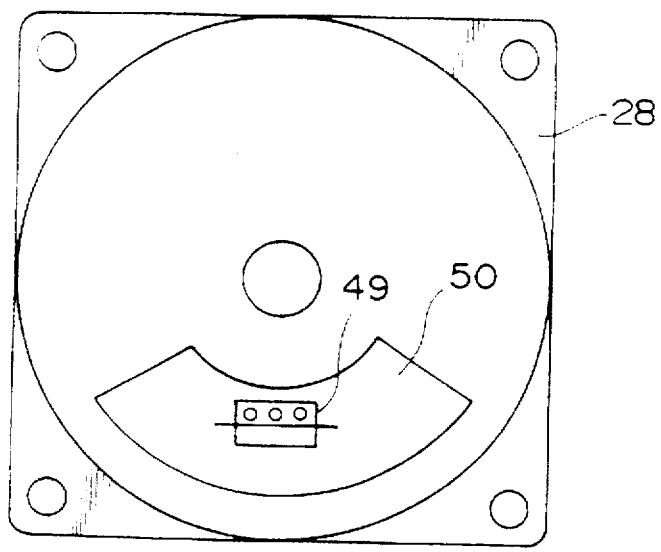
F I G. 4B
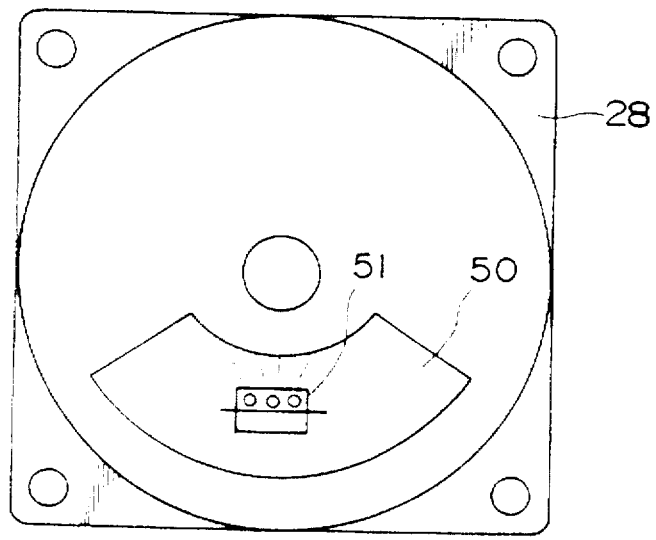

F I G. 5A
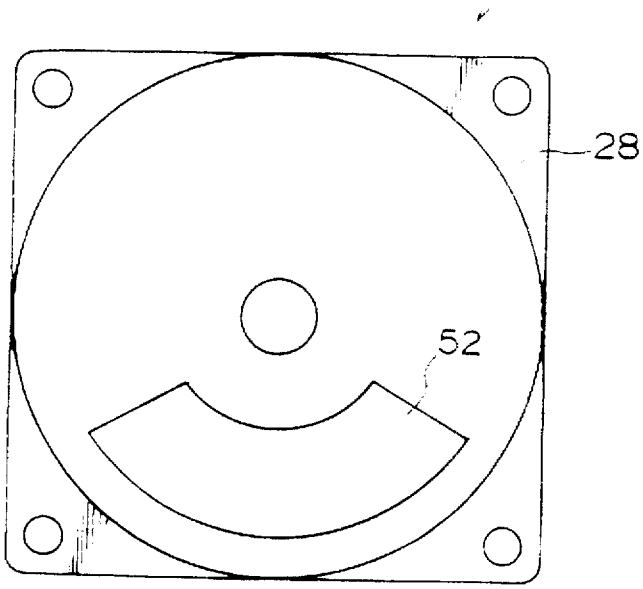
F I G. 5B
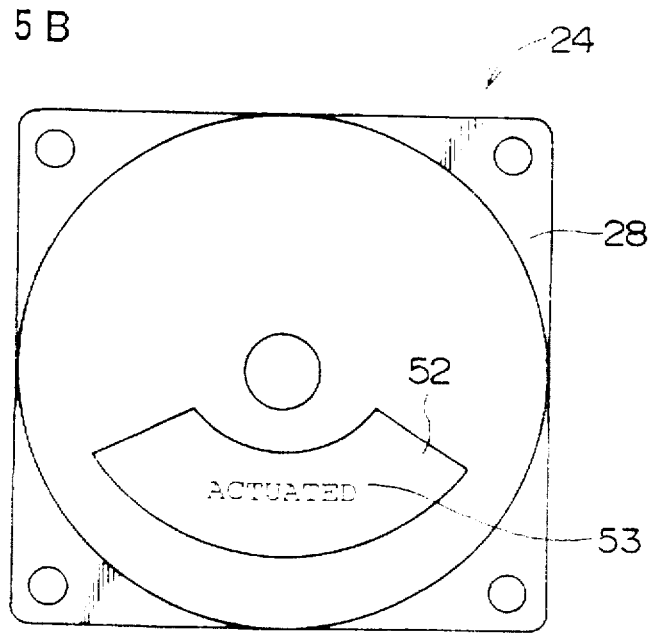

1

INFLATOR WITH AN ACTUATION INDICATOR

BACKGROUND OF THE INVENTION

1. Field of the Invention

The present invention relates to an inflator for generating a gas and heat upon actuation thereof.

2. Description of the Related Art

As a passive vehicle occupant restraint system, air bags, for instance, are in widespread use. An air bag of this type is provided with a sensor of a mechanical ignition type or an electric ignition type for detecting a state of collision. When the sensor detects the state of collision, the inflator is actuated to eject a high-temperature gas, thereby to inflate a bag.

The structure of an inflator of this type is disclosed in Japanese Patent Application Laid-Open (JP-A) No. 5-213149. To give a brief description, as shown in FIG. 7, an inflator 100 has an upper case 102 and a lower case 104 which are made of an aluminum alloy or the like and are formed integrally as their joining surfaces are welded together. A sensor 106 of the mechanical ignition type for detecting the state of collision is disposed in an axial portion of the inflator 100. Disposed immediately above the sensor 106 are a detonator 107, which is ignited by being pierced by an unillustrated firing pin, and a fire propagating agent 108 for propagating the flame from the detonator 107. A gas generating agent 110, which burns by the flame propagated by the fire propagating agent 108, is sealed in around the sensor 106. As the gas generating agent 110 is burned, a large amount of high-temperature gas is generated.

There has been a demand to reutilize, for instance, the upper case 102 and the lower case 104 after the inflator 100 is actuated. Generally, however, a caution label is attached to the bottom surface or the like of the lower case 104 of the inflator 100 to call attention not to subject the inflator 100 to heating, electrical energization, or the like during removal of the air bag or repairing of a steering wheel. For this reason, if the inflator 100 of the air bag has been actuated, the inflator 100 could be removed and heated by ignoring the contents of the caution label, but since this caution label still exists even after its actuation, it is liable to be thought that the inflator 100 must not be subjected to melting or the like for the purpose of reutilization. That is, the caution label merely continues to remain in its intact form even after the actuation of the inflator 100, so that it is impossible to identify whether or not the inflator 100 was actuated, thereby constituting a factor hampering the reutilization of the inflator 100.

SUMMARY OF THE INVENTION

In view of the above-described circumstances, it is an object of the present invention to provide an inflator which promotes reutilization by changing the appearance of the inflator by heat generated during the actuation of the inflator.

In accordance with a first aspect of the present invention, there is provided an inflator for generating gas and heat as the inflator is actuated, the inflator comprising: an identifying means provided on the inflator and permitting the identification of an unactuated state and an actuated state of the inflator on the basis of heat generated during actuation.

In accordance with a second aspect of the present invention, in the inflator for generating gas and heat as the inflator is actuated according to the first aspect of the invention, the identifying means has a shape changing member which undergoes a change in its shape on the basis of the heat generated during the actuation.

In accordance with a third aspect of the present invention, in the inflator for generating gas and heat as the inflator is actuated according to the second aspect of the invention, the identifying means has a display member which, in conjunction with the change in the shape of the shape changing member, displays by means of at least one of characters and a symbol the fact that the inflator has been actuated.

In accordance with a fourth aspect of the present invention, in the inflator for generating gas and heat as the inflator is actuated according to the first aspect of the invention, the identifying means undergoes a change in its pattern, a disappearance of its pattern, or a generation of its pattern on the basis of the heat generated during the actuation.

In accordance with a fifth aspect of the present invention, in the inflator for generating gas and heat as the inflator is actuated according to the first aspect of the invention, the identifying means has a display member which, on the basis of the heat generated during the actuation, displays by means of at least one of characters and a symbol the fact that the inflator has been actuated.

In accordance with a sixth aspect of the present invention, in the inflator for generating gas and heat as the inflator is actuated according to the first aspect of the invention, the identifying means undergoes a change in its color, a disappearance of its color, or a generation of its color on the basis of the heat generated during the actuation.

In accordance with the first aspect of the present invention, since the inflator is provided with the identifying means which permits the identification of the unactuated state and the actuated state of the inflator on the basis of heat generated during actuation, if the inflator is actuated, on the basis of the heat generated at that time it is possible to identify the fact that the inflator has been actuated.

In accordance with the second aspect of the present invention, in the first aspect of the invention, when the inflator is actuated, the shape changing member undergoes a change in its shape on the basis of the heat generated at that time. As a result, it can be identified that the inflator has been actuated.

In accordance with the third aspect of the present invention, in the second aspect of the invention, when the inflator is actuated, in conjunction with the change in the shape of the shape changing member the display member displays by means of at least one of characters and a symbol the fact that the inflator has been actuated. As a result, it can be identified that the inflator has been actuated.

In accordance with the fourth aspect of the present invention, in the first aspect of the invention, when the inflator is actuated, the identifying means undergoes a change in its pattern, a disappearance of its pattern, or a generation of its pattern on the basis of the heat generated at that time. As a result, it can be identified that the inflator has been actuated.

In accordance with the fifth aspect of the present invention, in the first aspect of the invention, when the inflator is actuated, on the basis of the heat generated at that time the display member displays by means of at least one of characters and a symbol the fact that the inflator has been actuated. As a result, it can be identified that the inflator has been actuated.

In accordance with the sixth aspect of the present invention, in the first aspect of the invention, when the inflator is actuated, the identifying means undergoes a change in its color, a disappearance of its color, or a generation of its color on the basis of the heat generated at that time. As a result, it can be identified that the inflator has been actuated.

As described above, the inflator in accordance with the first aspect of the present invention is provided with the identifying means which permits the identification of the unactuated state and the actuated state of the inflator on the basis of heat generated during actuation. Hence, an outstanding advantage is obtained in that the reutilization of the inflator can be promoted.

As for the inflator in accordance with the second aspect of the present invention, in the first aspect of the invention, the identifying means is provided with the shape changing member which undergoes a change in its shape on the basis of the heat generated during the actuation. Hence, in the same way as in the first aspect of the present invention, an outstanding advantage is obtained in that the reutilization of the inflator can be promoted.

Further, since the arrangement provided is such that the shape is made to undergo a change on the basis of the heat generated during the actuation, an outstanding advantage is obtained in that the arrangement can be made simple.

As for the inflator in accordance with the third aspect of the present invention, in addition to the arrangement described in the second aspect of the invention, the inflator is provided with the display member which, in conjunction with the change in the shape of the shape changing member, displays by means of at least one of characters and a symbol the fact that the inflator has been actuated. Hence, in the same way as in the second aspect of the present invention, an outstanding advantage is obtained in that the reutilization of the inflator can be promoted.

Further, since the fact that the inflator has been actuated is displayed directly by the display member by means of characters or the like, an outstanding advantage is obtained in that it is possible to reliably confirm whether or not the inflator has been actuated.

As for the inflator in accordance with the fourth aspect of the present invention, in the first aspect of the invention, the identifying means undergoes a change in its pattern, a disappearance of its pattern, or a generation of its pattern on the basis of the heat generated during the actuation. Hence, in the same way as in the first aspect of the present invention, an outstanding advantage is obtained in that the reutilization of the inflator can be promoted.

Further, since the arrangement provided is such that, on the basis of the heat generated during the actuation, the pattern is made to undergo a change, or the pattern is made to disappear or is generated, an outstanding advantage is obtained in that the arrangement can be made simple.

As for the inflator in accordance with the fifth aspect of the present invention, in the first aspect of the invention, the identifying means is provided with the display member which, on the basis of the heat generated during the actuation, displays by means of at least one of characters and a symbol the fact that the inflator has been actuated. Hence, in the same way as in the first aspect of the present invention, an outstanding advantage is obtained in that the reutilization of the inflator can be promoted.

Further, since the fact that the inflator has been actuated is displayed directly by the display member by means of characters or the like, an outstanding advantage is obtained in that it is possible to reliably confirm whether or not the inflator has been actuated.

As for the inflator in accordance with the sixth aspect of the present invention, in the first aspect of the invention, the identifying means undergoes a change in its color, a disappearance of its color, or a generation of its color on the basis of the heat generated during the actuation. Hence, in the same way as in the first aspect of the present invention, an outstanding advantage is obtained in that the reutilization of the inflator can be promoted.

Further, since the arrangement provided is such that, on the basis of the heat generated during the actuation, the color is made to undergo a change, or the color is made to disappear or is generated, an outstanding advantage is obtained in that the arrangement can be made simple.

The above and other objects, features and advantages of the present invention will become more apparent from the following detailed description of the invention when read in conjunction with the accompanying drawings.

BRIEF DESCRIPTION OF THE DRAWINGS

FIG. 3 is a perspective view of the air bag shown in FIG. 2 in a state in which the air bag is separated from a steering wheel;

FIG. 4A is a bottom view of the inflator prior to its actuation, illustrating an arrangement of an identifying means in accordance with a second embodiment;

FIG. 4B is a bottom view of the inflator after its actuation, illustrating an arrangement of the identifying means in accordance with a second embodiment;

FIG. 5A is a bottom view of the inflator prior to its actuation, illustrating an arrangement of an identifying means in accordance with a third embodiment;

FIG. 5B is a bottom view of the inflator after its actuation, illustrating an arrangement of the identifying means in accordance with the third embodiment;

DESCRIPTION OF THE PREFERRED EMBODIMENTS

Figure 1:
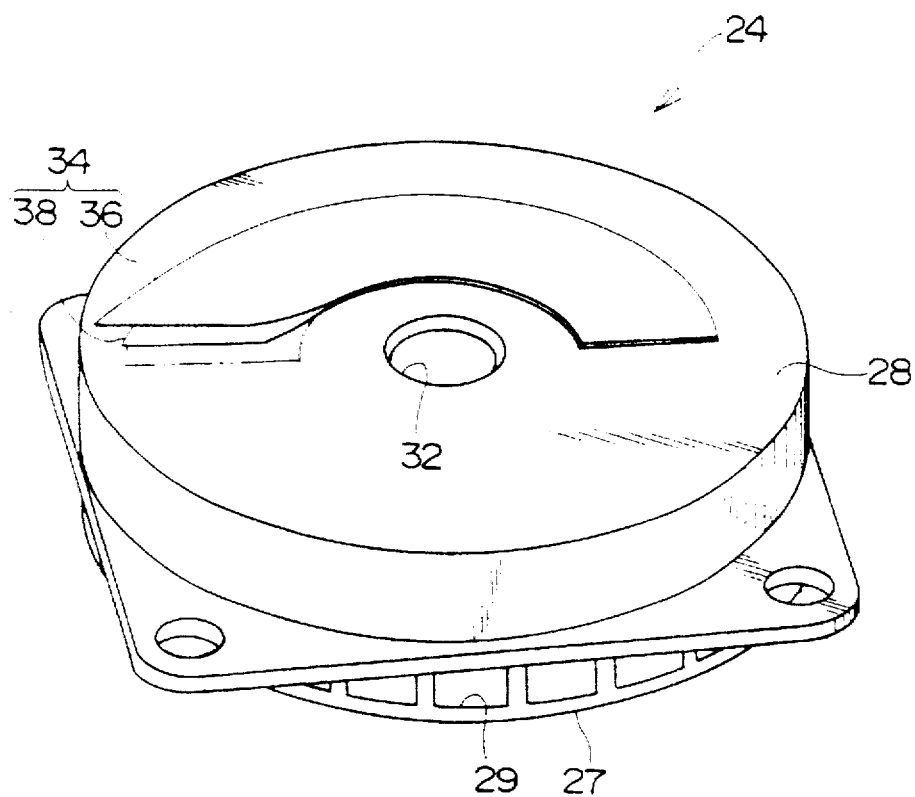
FIG. 1 is a perspective view of an inflator illustrating the arrangement of an identifying means in accordance with a first embodiment.
Figure 2:
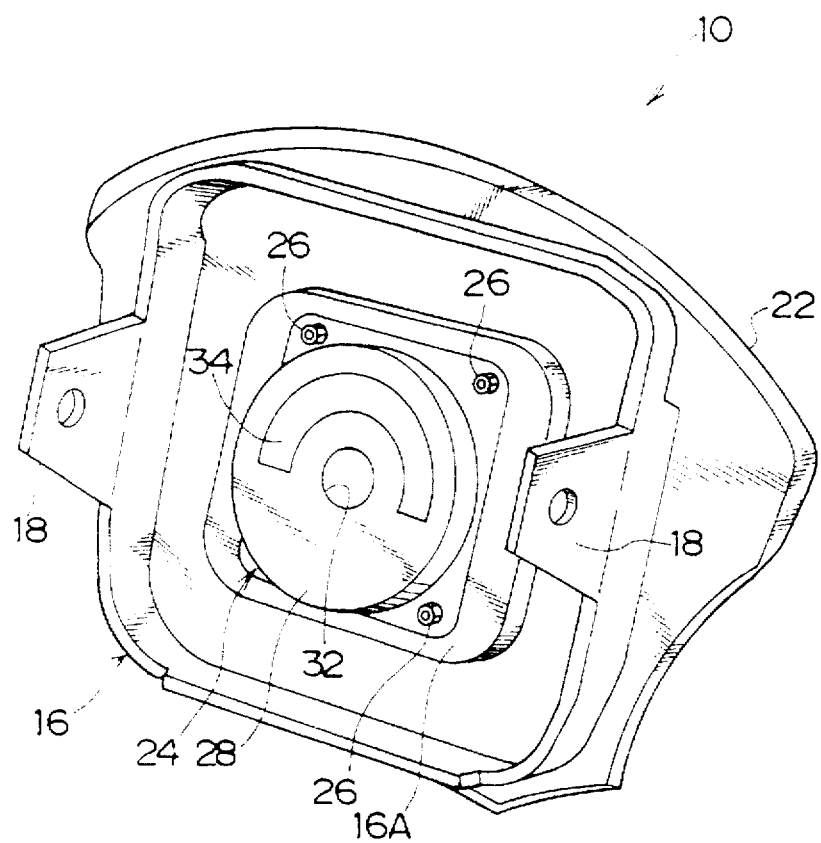
FIG. 2 is a perspective view, taken from the rear surface side, of an air bag provided with the inflator shown in FIG. 1.

Referring now to FIGS. 1 to 3, a description will be given of a first embodiment. It should be noted that this first embodiment corresponds to the embodiment of the present invention stated in the first to third aspects of the present invention.

FIG. 3 shows a perspective view of a state in which an air bag 10 for a driver seat is separated from a steering wheel 12. FIG. 2 shows a perspective view of a reverse surface of the air bag 10. As shown in these drawings, a pair of brackets 14 each having a bolt insertion hole are attached to vicinities of a hub 12A of the steering wheel 1. Correspondingly, a pair of legs 18, each capable of abutting against the bracket 14 and having a bolt insertion hole, are provided on a base plate 16 of the air bag 10. In a state in which the brackets 14 respectively abut against the legs 18, and the respective bolt insertion holes are positioned coaxially, the air bag 10 is affixed to the steering wheel 12 by means of unillustrated bolts and nuts.

As described above, the air bag 10 has the base plate 16 having a substantially box-shaped configuration. Attached to the base plate 16 is an air bag pad 22 which is fractured at a thin-walled portion 20 during a collision (during a sudden deceleration of a vehicle) and a pair of expanding portions 22A expand in directions away from each other. Incidentally, as for a method of attaching the air bag pad 22, among others there is a method in which the air bag pad 22 is attached to the base plate 16 via an unillustrated insert plate which is insert-molded in its interior. An unillustrated bag is accommodated between the air bag pad 22 and the base plate 16 in a folded state.

In addition, a protruding portion 16A which is square as seen from the reverse side is formed in a central portion of the base plate 16. An inflator 24 is secured to the producing portion 16A by means of bolts 26.

As shown in FIG. 1, the inflator 24 has an upper case 27, which is inserted in the protruding portion 16A of the base plate 16, and a lower case 28, which is fitted to the upper case 27 and is formed integrally by welding. A plurality of gas ejecting holes 29 are formed in a peripheral wall of the upper case 27. Meanwhile, a through hole 32 is formed in an axial portion of the lower case 28 of the inflator 24, and a squib (not shown) is disposed in this through hole 32. An unillustrated fire propagating agent is disposed immediately above the squib, and a gas generating agent, a coolant, a filter, and the like are accommodated around the squib. It should be noted that the case where the squib is used is the case of the electric ignition type, and an acceleration sensor is disposed in the case of the mechanical ignition type.

Here, a substantially fan-shaped caution label 34 serving as an identifying means is bonded to the bottom surface of the lower case 28 of the above-described inflator 24. The caution label 34 has a two-layered structure comprising an upper label layer 36 serving as a shape-changing member and a lower label layer 38 serving as a display member. Usual handling precautions (i.e., instructions concerning the air bag 10 in an unactuated state, e.g., "DO NOT HEAT") are written on the upper label layer 36. This upper label layer 36 is made of a material which shrinks at about 100° C., e.g., a polystyrene-based film material. Meanwhile, the fact that the inflator 24 has been actuated and appropriate information for reutilization (e.g., "AIR BAG HAS BEEN ACTUATED" and the types of metal used, as useful information for reutilization) are written on the lower label layer 38. In addition, this lower label layer 38 is made of a material which allows the written notes to be readable even at about 180° C., e.g., a polyester-based film material. The upper label layer 36 and the lower label layer 38 are laminated by means of an adhesive.

Incidentally, since the upper label layer 36 and the lower label layer 38 are fabricated separately, if a color indicating safety (e.g., a green color, a blue color, or the like) is provided on the lower label layer 38, and a color capable of calling attention (e.g., a yellow color, a red color, or the like) is provided on the upper label layer 36, it is possible to enhance the information-providing effect regarding the written contents.

Next, a description will be given of the operation and effect of this embodiment.

At the time of a collision, a predetermined electric current flows across the squib. Consequently, the fire propagating agent is ignited, and its flame is propagated to the gas generating agent. For this reason, the gas generating agent is burned, and a large amount of high-temperature gas is generated. Incidentally, the generated gas flows into the bag through the gas ejecting holes formed in the inflator 24, and inflates the bag. As a result, the air bag pad 22 ruptures along the thin-walled portion 20, and the bag projects toward the occupant seated in the driver seat while expanding the pair of expanding portions 22A.

Here, as the high-temperature gas is ejected from the inflator 24, the temperature of the lower case 28 of the inflator 24 also rises. For this reason, when the temperature of the lower case 28 reaches about 100° C., the upper label layer 36 shrinks and in some cases falls off the lower case 28. Accordingly, the lower label layer 38 is exposed. Incidentally, although the temperature of the lower case 28 rises to 180° C. or thereabouts, even if the temperature of the lower label layer 38 reaches this temperature level, the lower label layer 38 maintains its readable state. Since the aforementioned information is written on the lower label layer 38, an operator is capable of reading the information written on the lower label layer 38 so as to reutilize the inflator 24.

Thus, the arrangement provided in this embodiment is such that the caution label 34 is formed as a two-layered structure comprising the upper label layer 36 and the lower label layer 38, and after the actuation of the inflator 24, the upper label layer 36 on which the usual precautions are written is caused to shrink and peel off due to the heat generated at that time, with the result that only the lower label layer 38 for identifying the actuation of the inflator 24 remains. Therefore, it is possible to promote the reutilization of the inflator 24.

Further, in accordance with this embodiment, the lower label layer 38 is exposed in conjunction with a change in the shape of the upper label layer 36, and the fact that the inflator 24 has been actuated and the like are directly displayed by means of characters, it is possible to improve the identifiability as compared with a case where an indirect display is given.

Incidentally, in this embodiment, the caution label 34 is formed as a two-layered structure comprising the upper label layer 36 and the lower label layer 38, and the shape of the upper label layer 36 is changed (shrunk and peeled off) by the heat during the actuation of the inflator 24, it is possible to adopt various arrangements as the shape changing member. For example, an arrangement may be provided such that, instead of the lower label layer 38, a layer of wax applied to this portion (or a vinyl sheet layer attached thereto) is provided, and when the temperature reaches a predetermined level, the wax (or the vinyl sheet) is melted (or changes its shape) to cause the upper label layer 36 to fall off. Still alternatively, the fact that the inflator 24 has been actuated may be identified by making use of a shape memory alloy, a bimetal, or the like. Furthermore, an arrangement may be provided such that the upper label layer 36 is adapted to shrink at about 100° C. as described above, and the lower label layer 38 is attached to a position different therefrom, and a thin metal film which melts at a temperature above about 100° C. and below 180° C. or thereabouts is attached to the surface of the lower label layer 38.

Next, referring to FIGS. 4A and 4B, a description will be given of a second embodiment. It should be noted that this second embodiment corresponds to the embodiment of the present invention stated in the fourth aspect of the present invention. In addition, the same portions as those of the first embodiment will be denoted by the same reference numerals, and a description thereof will be omitted.

FIG. 4A shows a diagram of the bottom surface of the inflator 24 before its actuation. As shown in this drawing, a label 50 displaying a pattern 49 (e.g., a figure representing the shape of the inflator) which indicates that the inflator 24 has not been actuated is displayed on the bottom surface of the lower case 28 of the inflator 24 before the actuation of the inflator 24. Then, when the inflator 24 is actuated, as shown in FIG. 4B, lines representing the ejecting gas appears due to the heat at that time in addition to the aforementioned pattern 49, so that the pattern is transformed into a pattern 51 indicating that the inflator 24 has been actuated. Accordingly, through the change in this pattern, the operator is capable of identifying that the inflator 24 has not been actuated, so that the inflator 24 can be reutilized. Incidentally, although in this second embodiment the pattern 49 depicted on the label 50 is adapted to change, the present invention is not limited to the same, and an arrangement may be provided such that a pattern is displayed directly on the surface of the inflator 24.

Further, since the arrangement adopted in this embodiment is such that the pattern 49 is transformed into the pattern 51 by the heat during the actuation of the inflator 24, the arrangement can be made simple.

Although the arrangement of transforming the pattern 49 into the pattern 51 is adopted in this embodiment, the present invention is not limited to the same, and an arrangement may be provided such that no pattern is shown in the unactuated state of the inflator 24, and a pattern is produced upon actuation thereof, or vice versa.

Next, referring to FIGS. 5A and 5B, a description will be given of a third embodiment. It should be noted that this third embodiment corresponds to the embodiment of the present invention stated in the fifth aspect of the present invention. In addition, the same portions as those of the first embodiment will be denoted by the same reference numerals, and a description thereof will be omitted.

FIG. 5A shows a diagram of the bottom surface of the inflator 24 before its actuation. As shown in this drawing, a label 52 which gives no display prior to the actuation of the inflator 24 is bonded to the bottom surface of the lower case 28 of the inflator 24. When the inflator 24 is actuated in this state, as shown in FIG. 5B, characters 53 of "ACTUATED" are made to loom and are displayed by the heat at that time. Accordingly, through this display the operator is capable of identifying that the inflator 24 has been actuated, so that the inflator 24 can be reutilized. Incidentally, only the upper label layer 36 of the caution label 34 may be attached as it is, or may be caused to shrink or peel off by the above-described arrangement. It should be noted that although, in this third embodiment, the characters 53 are displayed on the label 52, the present invention is not limited to the same, and an arrangement may be provided such that the characters are displayed directly on the surface of the inflator 24.

Further, since the arrangement provided in this embodiment is such that the characters 53 of "ACTUATED" are made to loom by the heat during the actuation of the inflator 24, it is possible to improve the identifiability as compared with a case where an indirect display is given.

As for the method of causing the characters 53 of "ACTUATED" to loom, it is possible to adopt, among others, a method in which the characters 53 of "ACTUATED" are written in advance with a material which develops color at a predetermined temperature, and a method in which the characters 53 of "ACTUATED" are inscribed in advance, and a metal (a metal of the same color as that of the lower case 28) which melts at a predetermined temperature is allowed to flow into the grooves of the characters and is hardened.

In addition, although in this embodiment the characters 53 of "ACTUATED" are made to loom, the present invention is not limited to the same, and a symbol representing that the inflator 24 has been actuated may be made to loom.

Next, referring to FIGS. 6A and 6B, a description will be given of a fourth embodiment. It should be noted that this fourth embodiment corresponds to the embodiment of the present invention stated in the sixth aspect of the present invention. In addition, the same portions as those of the first embodiment will be denoted by the same reference numerals, and a description thereof will be omitted.

Figure 6A:
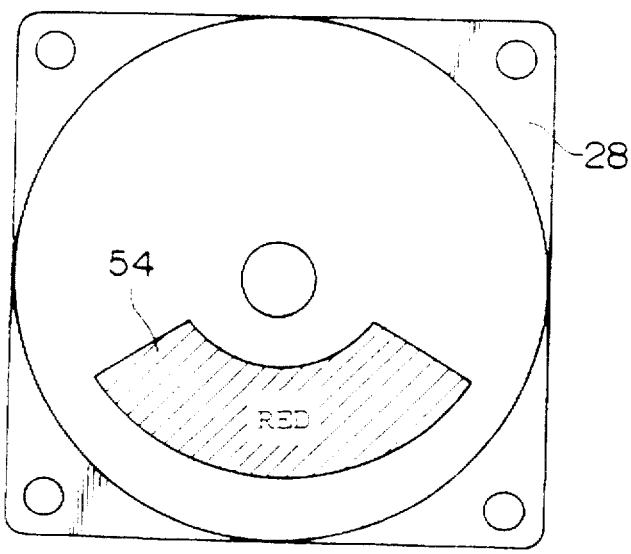
FIG. 6A is a bottom view of the inflator prior to its actuation, illustrating an arrangement of an identifying means in accordance with a fourth embodiment.
Figure 6B:
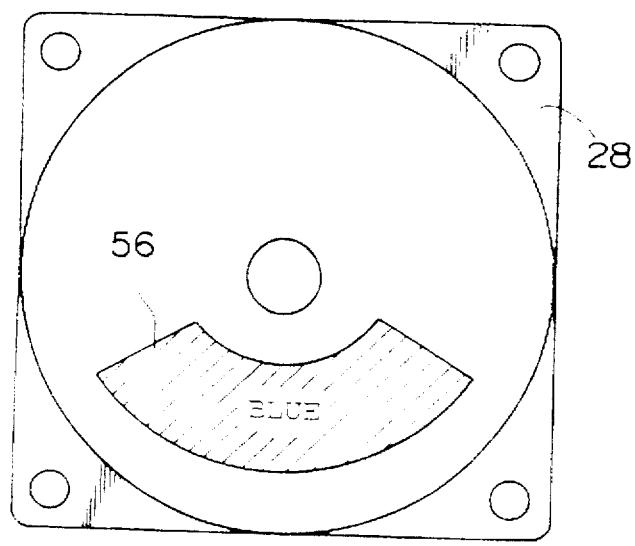
FIG. 6B is a bottom view of the inflator after its actuation, illustrating an arrangement of the identifying means in accordance with the fourth embodiment.
Figure 7:
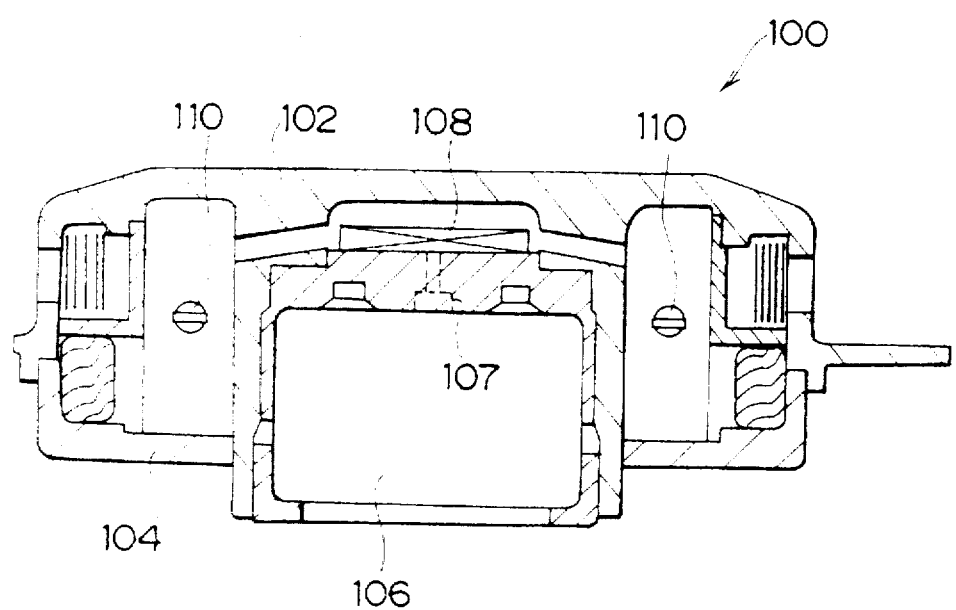
FIG. 7 is a vertical cross-sectional view illustrating a conventional inflator of an air bag.

FIG. 6A shows a diagram of the bottom surface of the inflator 24 before its actuation. As shown in this drawing, a substantially fan-shaped label 54 painted red prior to the actuation of the inflator 24 is bonded to the bottom surface of the lower case 28 of the inflator 24. When the inflator 24 is actuated in this state, as shown in FIG. 6B, the red label 54 is transformed into a blue label 56 by the heat at that time. Accordingly, through a change in the color the operator is capable of identifying that the inflator 24 has been actuated, so that the inflator 24 can be reutilized. Incidentally, only the upper label layer 36 of the caution label 34 used in the first embodiment may be attached as it is, or may be caused to shrink or peel off by the above-described arrangement. Although the arrangement provided in this fourth embodiment is such that the color of the label changes, the present invention is not limited to the same, and a red paint may be applied directly to the surface of the inflator 24. If a paint whose color changes by the actuating heat of the inflator 24 is used as this paint, it is possible to obtain an effect similar to that in the fourth embodiment.

Further, since the arrangement provided in this embodiment is such that the color is changed by the heat occurring during the actuation of the inflator 24, the arrangement can be made simple.

Although in this embodiment the arrangement of changing the red label 54 into the blue label 56 is adopted, the present invention is not limited to the same, and an arrangement may be provided such that no color is presented in the unactuated state of the inflator 24, and the color is developed by actuation thereof, or vice versa.

Although in the foregoing embodiments the inflator 24 of the air bag 10 for a driver seat has been cited as an example, the present invention is not limited to the same, and the present invention is similarly applicable to the inflator of the air bag 10 for a passenger seat and the inflator of the air bag 10 for side collision.

As for the label, pattern, display, and color used in the embodiments described above, it is essential that they change due to the heat occurring during the actuation of the inflator 24, and it is also essential that their state after the change continue to remain. In other words, they must be made of a material having an irreversible characteristic. It goes without saying that insofar as such a material is used, it is possible to use a material other than the aforementioned materials.

In addition, although in the foregoing embodiments the inflator 24 is used for the air bag 10, the present invention is not limited to the same, and if the shape and the like of the inflator are altered, the present invention is applicable to a pretensioner for retracting a buckle device during a collision or for rotating the takeup shaft of a webbing retractor at high speed in the taking-up direction.

What is claimed is:

1. An inflator for generating gas and heat as the inflator is actuated, said inflator comprising:

an identifying means provided on said inflator and permitting the identification of an unactuated state and an actuated state of said inflator by said inflator changing so as to have a predetermined external appearance due to heat generated during actuation.

2. An inflator according to claim 1, wherein said identifying means has a shape changing member which undergoes a change in its shape on the basis of the heat generated during the actuation.

3. An inflator according to claim 2, wherein said identifying means has a display member which, in conjunction with the change in the shape of said shape changing member, displays, by means of at least one of characters and a symbol, the fact that said inflator has been actuated.

4. An inflator according to claim 2, wherein said shape changing member is formed of a material which shrinks due to the generated heat and falls off said inflator.

5. An inflator according to claim 1, wherein said identifying means undergoes a change in its pattern, a disappearance of its pattern, or a generation of its pattern on the basis of the heat generated during the actuation.

6. An inflator according to claim 1, wherein said identifying means has a display member which, on the basis of the heat generated during the actuation, displays, by means of at least one of characters and a symbol, the fact that said inflator has been actuated.

7. An inflator according to claim 1, wherein said identifying means undergoes a change in its color, a disappearance of its color, or a generation of its color on the basis of the heat generated during the actuation.

8. An inflator according to claim 7, wherein said identifying means is formed of a material whose color changes, disappears, or is generated and which exhibits an irreversible characteristic after the change, disappearance, or generation of the color.

9. An inflator for generator gas and heat as the inflator is actuated, said inflator comprising:

an identifying label provided on said inflator and permitting the identification of an unactuated state and an actuated state of said inflator by said inflator changing so as to have a predetermined external appearance due to heat generated during actuation.

10. An inflator according to claim 9, wherein said identifying label has a shape changing member and a display member, and wherein said shape changing member undergoes a change in its shape on the basis of the heat generated during the actuation, and in conjunction with the change in the shape of said shape changing member said display member displays, by means of characters, the fact that said inflator has been actuated.

11. An inflator according to claim 10, wherein said display member is formed of a polyester-based film material.

12. An inflator according to claim 10, wherein said shape changing member is formed of a material which shrinks due to the generated heat and falls off said inflator.

13. An inflator according to claim 12, wherein said shape changing member is formed of a polystyrene-based film material.

14. An inflator according to claim 9, wherein said identifying label undergoes a change in its pattern on the basis of the heat generated during the actuation.

15. An inflator according to claim 14, wherein said pattern indicates the shape of said inflator.

16. An inflator according to claim 9, wherein said identifying label has a display member which, on the basis of the heat generated during the actuation, displays, by means of characters, the fact that said inflator has been actuated.

17. An inflator according to claim 16, wherein said display member displays a set of characters which reads "actuated".

18. An inflator according to claim 9, wherein said identifying label undergoes a change in its color on the basis of the heat generated during the actuation.

19. An inflator according to claim 18, wherein said identifying means is formed of a material whose color changes, disappears, or is generated and which exhibits an irreversible characteristic after the change, disappearance, or generation of the color.

20. An inflator according to claim 19, wherein said identifying means displays a red color before the actuation of said inflator, and displays a blue color after the actuation of said inflator.

* * * * *